(12) United States Patent
Igarashi et al.

(10) Patent No.: US 6,236,848 B1
(45) Date of Patent: *May 22, 2001

(54) RECEIVER INTEGRATED CIRCUIT FOR MOBILE TELEPHONE

(75) Inventors: Sadao Igarashi; Kazuharu Aoki, both of Fukushima-ken (JP)

(73) Assignee: Alps Electric Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/816,603

(22) Filed: Mar. 13, 1997

(30) Foreign Application Priority Data

Mar. 29, 1996 (JP) .................................................. 8-077098

(51) Int. Cl.[7] ................................ H04B 1/16; H04B 1/06; H03D 3/22
(52) U.S. Cl. ........................ 455/341; 455/232.1; 375/329; 375/330
(58) Field of Search ............................... 455/341, 337, 455/338, 553, 552, 575, 232.1, 234.1; 375/329, 330, 332, 318

(56) References Cited

U.S. PATENT DOCUMENTS

| | | |
|---|---|---|
| 4,910,467 * | 3/1990 | Leitch ................................. 329/306 |
| 4,989,220 * | 1/1991 | Serrone ................................. 375/83 |
| 5,107,225 | 4/1992 | Wheatley, III et al. . |
| 5,142,695 | 8/1992 | Roberts et al. . |
| 5,187,809 | 2/1993 | Rich et al. . |
| 5,228,074 * | 7/1993 | Mizikovsky ............................ 379/59 |
| 5,325,401 * | 6/1994 | Halik et al. ............................ 375/83 |
| 5,327,097 | 7/1994 | Igarashi et al. ...................... 330/254 |
| 5,446,422 * | 8/1995 | Mattila et al. ........................ 332/403 |
| 5,467,055 | 11/1995 | Wray et al. .......................... 330/129 |
| 5,469,115 | 11/1995 | Peterzell et al. . |
| 5,745,839 * | 4/1998 | Lieberman ............................ 455/10 |
| 5,764,707 * | 6/1998 | Gurusami et al. .................... 375/329 |
| 5,787,126 * | 7/1998 | Itoh et al. ............................ 375/340 |

FOREIGN PATENT DOCUMENTS

WO 95/30275    11/1995  (WO) .
WO 96/08080     3/1996  (WO) .

OTHER PUBLICATIONS

Volz, H.: Elektronik, Akademi–Verlag Berlin, 4th edition, 1986, pp. 201 to 203.

* cited by examiner

Primary Examiner—Fan Tsang
Assistant Examiner—Sheila Smith
(74) Attorney, Agent, or Firm—Brinks Hofer Gilson & Lione

(57) ABSTRACT

A receive integrated circuit for a mobile telephone comprising a variable gain amplifier for amplifying a received signal with a variable gain, a low-pass filter for attenuating harmonic components of the signal amplifier by the variable gain amplifier, and a QPSK demodulator for demodulating by quadri-phase shift keying the signal having passed through the low-pass filter, wherein signal lines interconnecting the variable gain amplifier, the low-pass filter and the quadri-phase shift keying demodulator are balanced.

6 Claims, 3 Drawing Sheets

RECEIVER INTEGRATED CIRCUIT FOR MOBILE TELEPHONE

BACKGROUND OF THE INVENTION

The present invention relates to a receiver integrated circuit (hereinafter refereed to as a receiver IC) for use with a mobile telephone and, more particularly, to a receiver IC for a mobile telephone operating in a dual mode environment involving CDMA (code division multiple access) mode and FM (frequency modulation) mode.

FIG. 4 is a block diagram of a common mobile telephone operating in a dual mode environment involving CDMA mode and FM mode. The transmitter (TX) portion of the telephone works and is constituted as follows: signals I and Q output by a modem 101 are QPSK-modulated by a quadri-phase shift keying (QPSK) modulator 102. The modulated signals are amplified by a transmitter-side variable gain amplifier (TX-AMP; simply called a variable amplifier hereunder) 103. The amplified signals are mixed by a mixer (MIX) 104 together with a locally oscillated signal from a local oscillator (OSC) 121, whereby a radio frequency (RF) transmitted signal is produced. The RF transmitted signal is transmitted via a band-pass filter 105, a power amplifier (PA) 106, a duplexer 107 and an antenna 108.

The receiver (RX) portion of the mobile telephone works and is constituted as follows: an RF signal received via the antenna 108 is sent to a mixer (MIX) 111 by way of the duplexer 107, a low-noise amplifier (LNA) 109 and a band-pass filter 110. The received signal is mixed by the mixer 111 together with the locally oscillated signal from the local oscillator (OSC) 121, whereby an IF received signal is produced. The IF received signal is applied both to a CDMA band-pass filter 112 and to an FM band-pass filter 113. One of output signals from the two filters is selected in accordance with a currently established mode. The selected output signal from the filter is amplified by a receiver-side variable amplifier (RX-AMP) 114. The amplified signal is demodulated by a QPSK demodulator 115, and the demodulated signal is sent to the modem 101.

In the modem 101, a received signal intensity indication circuit 116 detects the intensity of the received signal. The detected reception intensity is compared with intensity reference data by a comparator 117. The difference between the detected intensity and the reference data is sent both to a receiver-side AGC voltage correction circuit 118 and to a transmission output correction circuit 119. The receiver-side AGC voltage correction circuit outputs an AGC voltage such that the difference sent from the comparator 117 will become zero, i.e., that the output of the circuit 116 will coincide with the reference intensity data, whereby the gain of the receiver-side variable amplifier (RX-AMP) 114 is controlled.

The transmission output correction circuit 119 on the transmitter side is supplied both with the difference from the comparator 117 and with transmission output correction data reflecting the line status between the mobile telephone and a base station. A transmitter-side AGC voltage correction circuit 120 outputs an AGC voltage according to the transmission output correction data to control the gain of the variable amplifier (TX-AMP) 103 so that the modulated signal will be inversely proportional to the level of the received signal.

When the mobile telephone of the above constitution is in CDMA mode, signals of −105 dBm through −25 dBm are input to the antenna 108. This means that the receiver portion must have a dynamic range of at least 80 dB for the received signals. In FM mode, signals of −120 dBm through −20 dBm enter the antenna 108. In the latter case, the receiver portion must have a dynamic range of at least 100 dB.

Such extensive dynamic ranges are implemented by the receiver-side variable amplifier 114 having a plurality of variable amplifiers cascaded as shown in FIG. 5, so that an IF received signal with pronounced level fluctuations will have a constant level at an input terminal of the QPSK demodulator 115. Harmonic components of the output signal from the variable amplifier 114 are attenuated by the low-pass filter (LPF) 4, and the resulting signal is input to the QPSK demodulator 115. By resorting to a 90-degree phase shifter 8, a PLL divider (1/N) 9 and an oscillator 10, the QPSK demodulator 115 demodulates the input signal back to the initial base-band signals I and Q.

In CDMA mode, signals of −105 dBm to −25 dBm entering the antenna are amplified by the variable amplifier 114 so that they will have a constant level at the input terminal of the QPSK demodulator 115. In FM mode, of the signals of −120 dBm to −20 dBm entering the antenna, those of −120 dBm to −40 dBm (i.e., for 80 dB) are amplified by the variable amplifier 114. The remaining signals of −40 dBm to −20 dBm, exceeding the control range of the variable amplifier 114, are saturated therein and forwarded at a constant level to the QPSK demodulator 115 through limiter operation.

The signals saturated in the variable amplifier 114 generate harmonic components twice to four times those of their unsaturated counterparts. These harmonic components are attenuated by the LPF 4 to 20 dB or less with respect to a fundamental wave. The characteristic of the LPF 4 is illustrated in FIG. 2. The output signal of the LPF 4 has a CN ratio greater than 20 dB. The QPSK demodulator 115 and an FM digital demodulator installed immediately downstream need to provide a CN ratio greater than 20 dB where the SN ratio of the demodulated signal is desired to be greater than 45 dB. The frequency of the oscillator shown in FIG. 5 is set to a frequency input to the variable amplifier 114.

In the conventional setup outlined above, harmonics, especially those of degree two, are characterized for their frequency being close to the signal and having high voltages. This requires that the LPF 4 for attenuating harmonics provide a steep cut-off characteristic depicted in FIG. 2. The LPF 4 is thus composed generally of an LC circuit and is not conducive to being implemented in IC form. A resonance coil L, included in the oscillator 10 for QPSK demodulation, is too bulky to be formed in IC. Because the resonance coil L needs adjustment after assembly, it cannot be incorporated in an IC arrangement.

One proposed solution to the above difficulties is a setup in which the LPF 4 (with connecting points 6 and 7) and resonance coil L in FIG. 5 are both separated and externally furnished while the variable amplifier 114, QPSK demodulator 115, 90-degree phase shifter 8, PLL divider 9 and oscillator 10 are built altogether into IC. One problem with this constitution is that the connecting points 6 and 7 of the LPF 4 are poorly isolated from the input terminal of the variable amplifier 114. The inadequate isolation makes it difficult to achieve gain control characteristics of 80 dB or more and tends to deteriorate gain slope linearity.

Experiments have shown that between 100 and 300 MHz, the isolation between terminals is about 40 to 50 dB. If the amplifier gain is set to −50 to +40 dB to satisfy other requirements, the necessary attenuation of −50 dB cannot be accomplished. In addition, where lead terminals for connecting the LPF 4 are installed in the IC, an oscillated signal from the resonance coil L reaches the connecting points 6 and 7 of the LPF 4 and the input terminal of the amplifier 114. The oscillated signal and a signal derived from limiter operation produces beat in the QPSK demodulator 115, whereby the CN ratio of the signals I and Q is deteriorated.

SUMMARY OF THE INVENTION

It is therefore an object of the present invention to overcome the above and other disadvantages of the prior art and to provide a receiver IC for a mobile telephone, the IC comprising a receiver circuit required to provide high-gain characteristics when used in a mobile telephone and the like operating in a dual mode environment involving CDMA mode and FM mode.

In carrying out the invention and according to one aspect thereof, there is provided a receiver IC for a mobile telephone, comprising: a variable gain amplifier for amplifying a received signal with a variable gain; a low-pass filter for attenuating harmonic components of the signal amplified by the variable gain amplifier; and a QPSK demodulator for demodulating by QPSK the signal having passed through the low-pass filter; wherein signal lines interconnecting the variable gain amplifier, the low-pass filter and the QPSK demodulator are balanced.

In the inventive receiver IC, the variable amplifier, low-pass filter and QPSK demodulator are interconnected by signals lines in a balanced manner to minimize harmonics that may be produced in the individual circuits. This eliminates the need for the low-pass filter to have a steep cut-off characteristic. Thus the low-pass filter may be made of an active filter that is furnished in IC form.

In a preferred structure according to the invention, the receiver IC for a mobile telephone further comprises an oscillator for outputting an oscillated signal with a transmitted signal twice a signal frequency inputted to the QPSK demodulator, and a divider for dividing by two the frequency of the oscillated signal before applying the signal to the QPSK demodulator, wherein signal lines interconnecting the QPSK demodulator and the divider are balanced.

In another preferred structure according to the invention, the receiver IC for a mobile telephone further comprises an amplifier for selecting a received signal in any one of CDMA mode and FM mode and outputting the selected signal to the variable gain amplifier, wherein signal lines interconnecting the amplifier and the variable gain amplifier are balanced.

DETAILED DESCRIPTION OF THE PREFERRED EMBODIMENT

A preferred embodiment of the invention will now be described with reference to the accompanying drawings.

Figure 1:
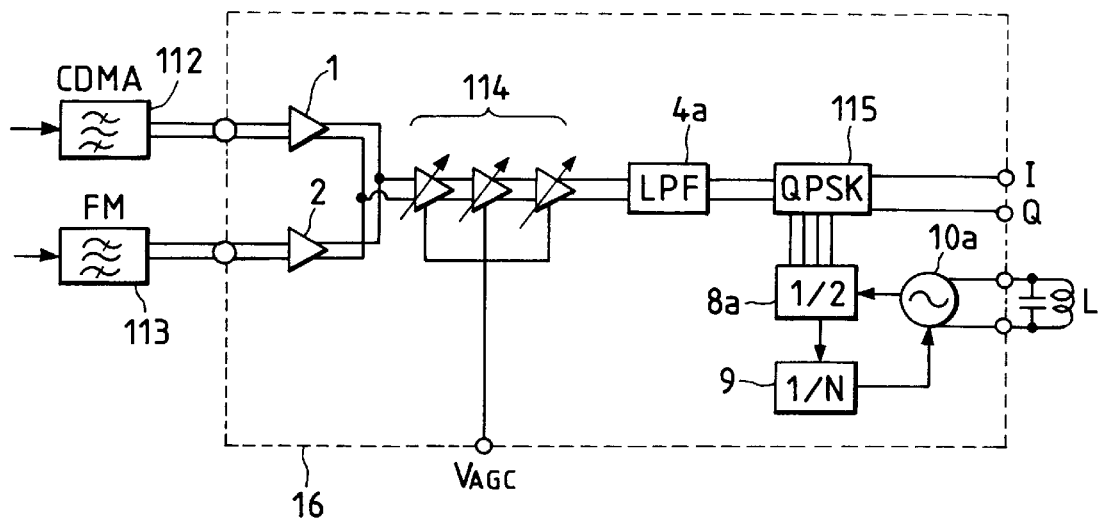
FIG. 1 is a block diagram of a receiver IC for a mobile telephone practiced as one embodiment of the invention.

In FIG. 1, an output signal from a CDMA band-pass filter 112 or from an FM band-pass filter 113 is selected respectively by an amplifier 1 or 2. The selected signal is amplified by a variable amplifier 114. Harmonic components of the amplified signal are attenuated by a low-pass filter (LPF) 4a. The resulting signal from the LPF 4a is demodulated by a QPSK demodulator 115. In the QPSK demodulator 115, the input signal is demodulated back to the initial base-band signals I and Q by means of a half divider 8a, a PLL divider 9 and an oscillator 10a. The oscillator 10a outputs an oscillated signal whose frequency is twice that of the signal demodulated by the QPSK demodulator 115. The half divider 8a divides the oscillated signal by two and sends the resulting signal to the QPSK demodulator 115.

The signal lines connecting the CDMA band-pass filter 112 and FM band-pass filter 113 to the amplifiers 1 and 2, variable amplifier 114, LPF 4a and QPSK demodulator 115 are balanced, and so are the signal lines connecting the half divider 8a to the QPSK demodulator 115. The amplifiers 1 and 2, variable amplifier 114, LPF 4a, QPSK demodulator 115, half divider 8a and oscillator 10a are all of balanced type and are implemented in IC form (designated by reference numeral 16 in FIG. 1).

Figure 2:
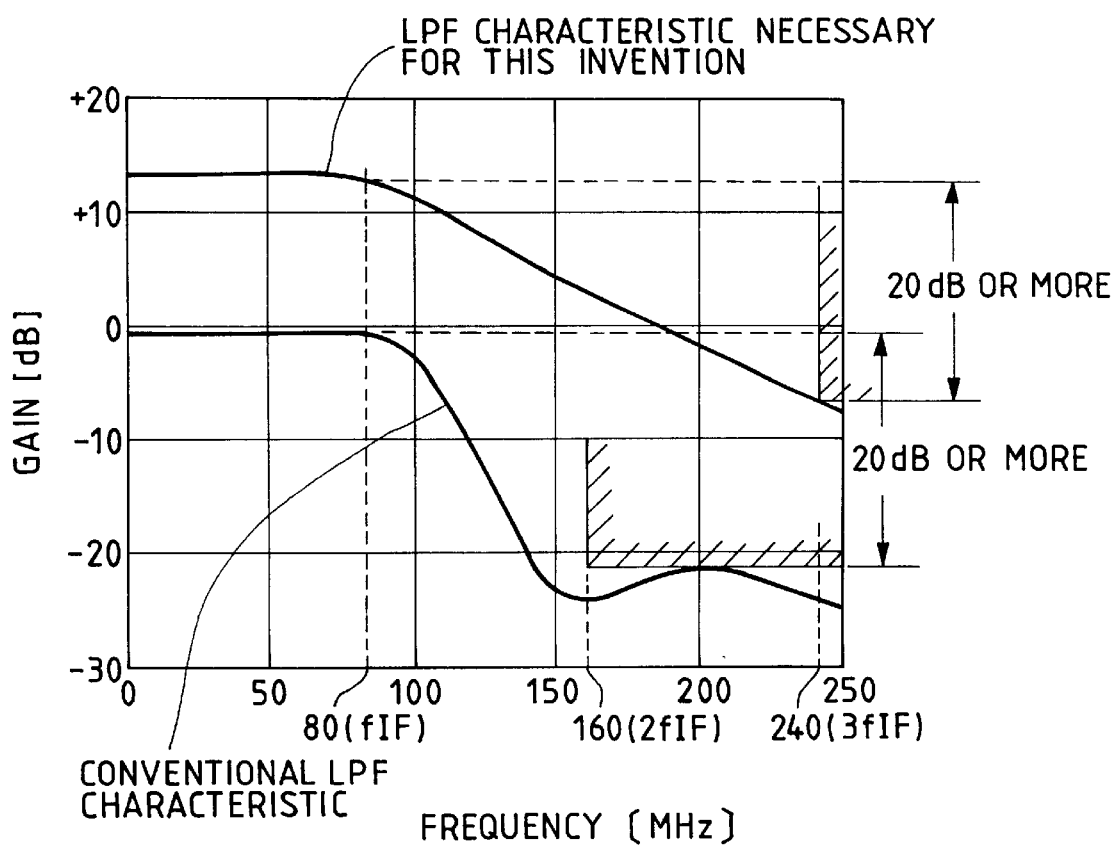
FIG. 2 is a graphic representation plotting characteristics of two low-pass filters, one forming part of the embodiment in FIG. 1, the other being a conventional LPF.
Figure 3:
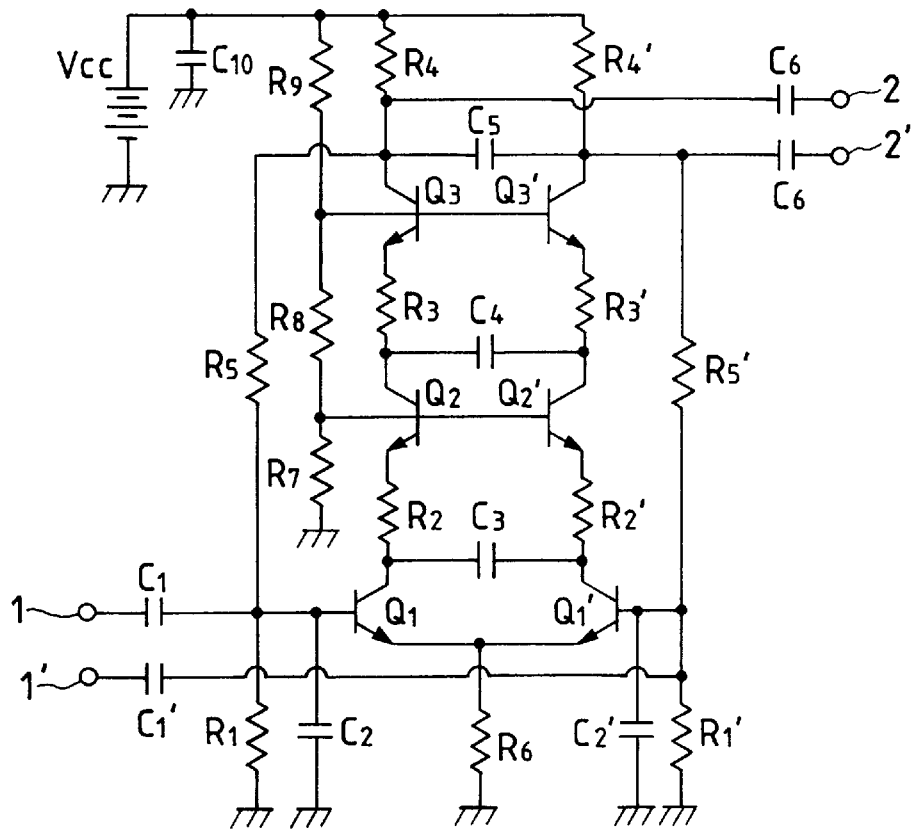
FIG. 3 is a circuit diagram showing details of the low-pass filter included in FIG. 1.
Figure 5:
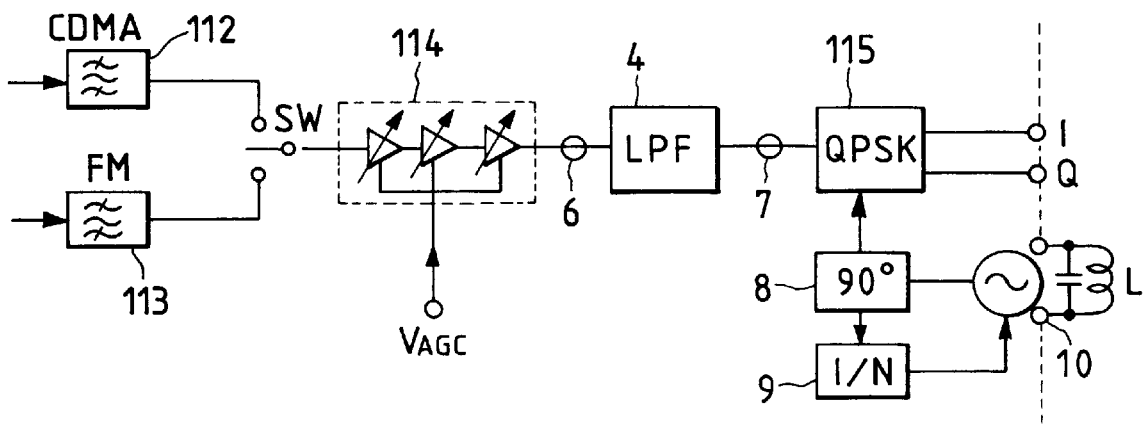
FIG. 5 is a block diagram of a conventional receiver circuit.
Figure 4:
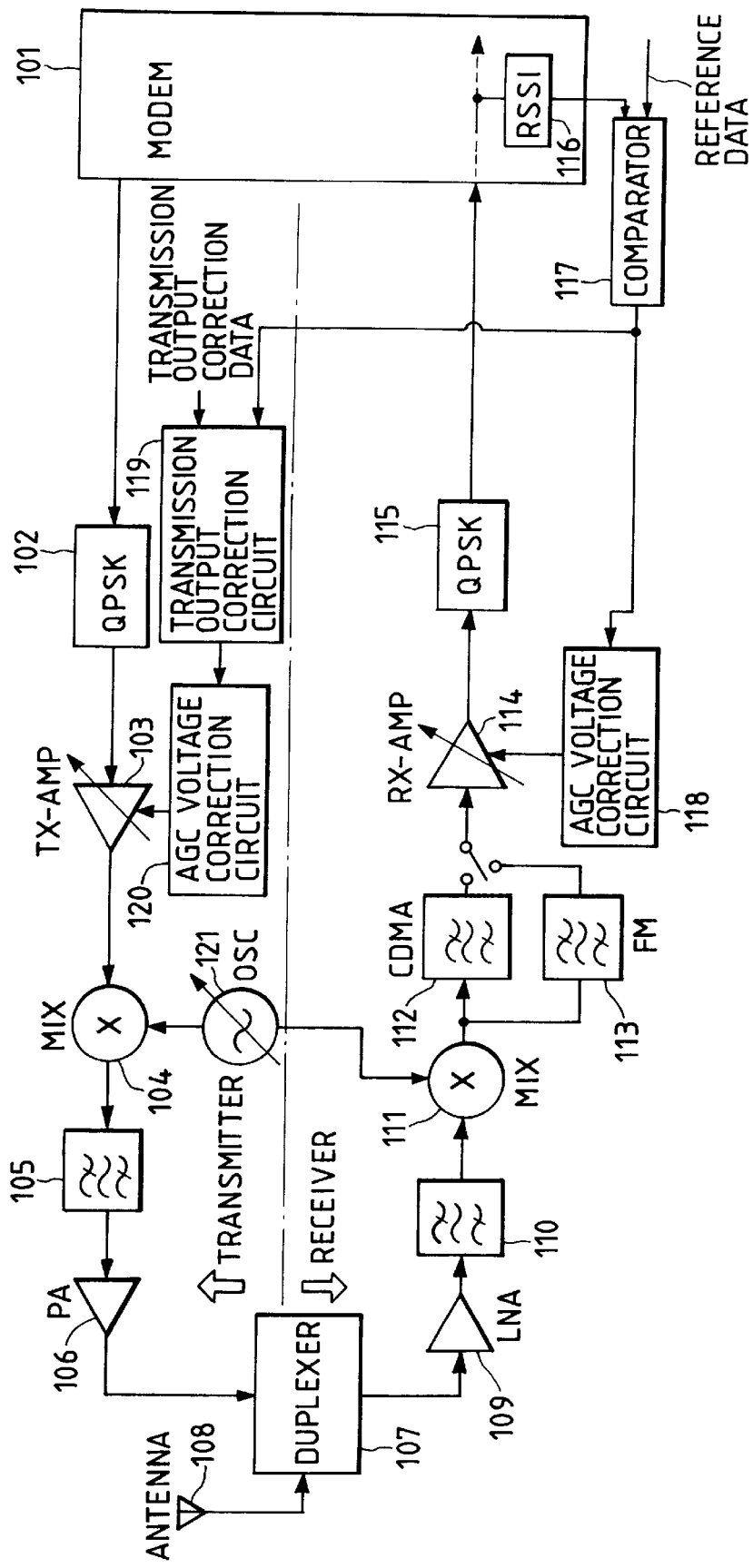
FIG. 4 is a block diagram showing a common mobile telephone operating in a dual mode environment involving CDMA mode and FM mode.

The overall gain variable range of the variable amplifier 114 is set for 80 to 90 dB. The LPF 4a is made of an active filter whose details are shown in FIG. 3. As illustrated in FIG. 2, the attenuation characteristic of the LPF 4a is set for 20 dB or higher with respect to harmonics of degree three or higher. The active filter making up the LPF 4a is disclosed illustratively in Japanese Patent Application No. Hei 6(1994)-333856 and will not be discussed further.

In the above constitution, the variable amplifier 114, LPF 4a and QPSK demodulator 115 are of balanced type so that, of the harmonics resulting from signals exceeding the gain variable range of the variable amplifier 114 (i.e., harmonics derived from limiter operation), those harmonics of even-numbered degrees are reduced to 20 dB or less with respect to the fundamental wave. As a result, the attenuation characteristic required of the LPF 4a need only be such as to attenuate harmonics of degree three or higher.

Because such a lenient attenuation characteristic is sufficient to fulfill its function, the LPF 4a may be constituted by an active filter. Thus the variable amplifier 114, LPF 4a and QPSK demodulator 115 are implemented in IC form. With the LPF 4a incorporated, the lead terminals for an externally furnished LPF arrangement are no longer necessary. This enhances circuit isolation. Experiments and simulations in electromagnetic fields have shown that a bipolar IC achieves circuit isolation of 70 dB or higher at 100 MHz. Where the gain variable range of the variable amplifier is set for −50 dB to+30 dB, the effects of circuit isolation are virtually eliminated. This allows the above-described IC form to provide gain control characteristics equivalent to those of conventional setups.

In the above constitution, the oscillator 10a outputs a signal with a an oscillation signal twice a signal frequency inputted to the QPSK demodulator and the half divider 8a and oscillator 10a are of balanced type. This arrangement minimizes the amount of signals leaving these circuits to reach the variable amplifier 114 or LPF 4a. In turn, the QPSK demodulator 115 ceases to suffer the beat of signals derived from the limiter operation, whereby the CN ratio of the signals I and Q is prevented from deterioration.

What is claimed is:

1. A receiver integrated circuit for a mobile telephone, comprising:
   a variable gain amplifier to amplify a CDMA and FM dual mode received signal with a variable gain, the overall gain variable range of said variable gain amplifier being from 80 to 90 dB;
   a low-pass filter to attenuate harmonic components of the signal amplified by said variable gain amplifier, said low-pass filter including an active filter that attenuates harmonics greater than second degree harmonics; and
   a quadri-phase shift keying demodulator to demodulate by quadri-phase shift keying the signal having passed through said low-pass filter;
   wherein said variable gain amplifier, low pass filter and the quadri-phase shift keying demodulator are contained in a balanced circuit, and balancing in said balanced circuit includes: an output terminal of said variable gain amplifier circuit is connected and balanced with an input terminal of said low-pass filter, and an output terminal of said low-pass filter is connected and balanced with an input terminal of said quadri-phase shift keying demodulator, such that harmonics resulting from signals exceeding the gain variable range of the variable amplifier of even-numbered degree are reduced to not greater than 20 dB with respect to a fundamental wave.

2. A receiver integrated circuit for a mobile telephone according to claim 1, further comprising an oscillator to output an oscillated signal with a frequency twice that of the signal input to said quadri-phase shift keying demodulator, and a divider for dividing by two the frequency of said oscillated signal before applying the signal to said quadri-phase shift keying demodulator, wherein said divider is contained in said balanced circuit, and balancing in said balanced circuit includes: an output terminal of said divider is connected and balanced with said input terminal of said quadri-phase shift keying demodulator.

3. A receiver integrated circuit for a mobile telephone according to claim 2, further comprising an amplifier to select a received signal in any one of CDMA mode and FM mode and to output the selected signal to said variable gain amplifier, wherein signal lines interconnecting said amplifier and said variable gain amplifier are balanced.

4. A receiver integrated circuit for a mobile telephone according to claim 1, further comprising:
   a CDMA band-pass filter to pass a received signal in CDMA mode;
   a CDMA signal amplifier to amplify said received signal passed through said CDMA band-pass filter and to apply said received signal amplified by said CDMA signal amplifier to said variable gain amplifier;
   a FM band-pass filter to pass a received signal in FM mode; and
   a FM signal amplifier to amplify said received signal passed through said FM band-pass filter and to apply said received signal amplified by said FM signal amplifier to said variable gain amplifier;
   wherein each of said CDMA band-pass filter, said CDMA signal amplifier, said FM band-pass filter and said FM signal amplifier is contained in a balanced circuit, and balancing in said balanced circuit includes: an output terminal of said CDMA band-pass filter is connected and balanced with an input terminal of said CDMA signal amplifier; an output terminal of said FM band-pass filter is connected and balanced with an input terminal of said FM signal amplifier; an output terminal of said CDMA signal amplifier is connected and balanced with an input terminal of said variable gain amplifier; and an output terminal of said FM signal amplifier is connected and balanced with an input terminal of said variable gain amplifier.

5. A receiver integrated circuit for a mobile telephone according to claim 1, said active filter comprising an active low-pass filter, said active low-pass filter including:
   a pair of emitter-grounded amplifies;
   a plurality of base-grounded amplifiers cascade-connected in stages to an output of each of said emitter-grounded amplifiers;
   capacitors connected between nodes disposed between one of said emitter-grounded amplifiers and the plurality of stages of the base-grounded amplifiers associated with the one of said emitter-grounded amplifiers and nodes disposed between the other of said emitter-grounded amplifiers and the plurality of stages of the base-grounded amplifiers associated with the other of said emitter-grounded amplifiers; and
   feedback resistors connected between outputs of final stages of the cascade-connections of the base-grounded amplifiers and inputs of the respective emitter-grounded amplifiers.

6. A receiver integrated circuit for a mobile telephone according to claim 1, said variable gain amplifier comprising a plurality of cascade-connected variable gain amplifiers.

* * * * *

UNITED STATES PATENT AND TRADEMARK OFFICE
CERTIFICATE OF CORRECTION

PATENT NO.   : 6,236,848 B1
DATED        : May 22, 2001
INVENTOR(S)  : Sadao Igarashi et al.

Page 1 of 1

It is certified that error appears in the above-identified patent and that said Letters Patent is hereby corrected as shown below:

<u>Title page, Column 2,</u>
 ABSTRACT,
Line 1, delete "receive" and substitute -- receiver -- in its place.
Line 4, delete "amplifier" and substitute -- amplified -- in its place.

Signed and Sealed this

Fifth Day of March, 2002

Attest:

JAMES E. ROGAN
*Attesting Officer*   *Director of the United States Patent and Trademark Office*